(12) United States Patent
Kamiya et al.

(10) Patent No.: US 6,754,579 B2
(45) Date of Patent: Jun. 22, 2004

(54) AUTOMATIC ENGINE STOP AND START SYSTEM

(75) Inventors: Masaru Kamiya, Toyoake (JP); Akira Kato, Anjo (JP); Naoki Tanaka, Anjo (JP)

(73) Assignee: Denso Corporation, Kariya (JP)

( * ) Notice: Subject to any disclaimer, the term of this patent is extended or adjusted under 35 U.S.C. 154(b) by 55 days.

(21) Appl. No.: 10/179,271

(22) Filed: Jun. 26, 2002

(65) Prior Publication Data

US 2003/0004635 A1 Jan. 2, 2003

(30) Foreign Application Priority Data

Jun. 27, 2001 (JP) ........................................ 2001-195204

(51) Int. Cl.$^7$ .............................. G06G 7/70; F02D 29/02
(52) U.S. Cl. ...................... 701/112; 701/113; 477/203
(58) Field of Search ................................ 701/112, 113, 701/53, 54; 477/99, 203, 205; 123/179.4

(56) References Cited

U.S. PATENT DOCUMENTS

| | | | |
|---|---|---|---|
| 6,347,608 B1 * | 2/2002 | Hara et al. ............... | 123/179.4 |
| 6,434,475 B2 * | 8/2002 | Kaneko et al. ............. | 701/112 |
| 6,466,860 B2 * | 10/2002 | Kaneko ........................ | 701/112 |
| 2002/0116113 A1 * | 8/2002 | Kaneko ........................ | 701/112 |

FOREIGN PATENT DOCUMENTS

| | | | | |
|---|---|---|---|---|
| EP | 0 072 997 A2 | 8/1982 | | |
| EP | 0 990 793 A2 | 9/1999 | | |
| EP | 1 036 694 A2 | 3/2000 | | |
| EP | 1065373 A2 * | 6/2000 | ........... | F02N/11/08 |
| JP | A 58-030438 | 2/1983 | | |
| JP | A 58-166165 | 10/1983 | | |
| JP | 59-164252 A * | 9/1984 | ........... | B60T/17/02 |
| JP | A 08-189395 | 7/1996 | | |
| JP | 2000-303871 A * | 10/2000 | ........... | F02D/29/02 |
| JP | 2001-12272 A * | 1/2001 | ........... | F02D/29/02 |

* cited by examiner

*Primary Examiner*—Hieu T. Vo
(74) *Attorney, Agent, or Firm*—Oliff & Berridge, PLC

(57) ABSTRACT

An engine automatic stop and start system monitors a booster negative pressure and a braking operation. A combination of the booster negative pressure and the brake operation can effectively indicate that a booster negative pressure will be insufficient to ensure a brake function. The controller evaluates the booster negative pressure and the brake operation, and restarts the engine when it is estimated that the booster negative pressure may be decreased below a threshold. As a result, it is possible to restart the engine before the booster negative pressure is decreased.

13 Claims, 14 Drawing Sheets

US 6,754,579 B2

AUTOMATIC ENGINE STOP AND START SYSTEM

CROSS REFERENCE TO RELATED APPLICATION

This application is based on Japanese Patent Application No. 2001-195204 filed on Jun. 27, 2001 the contents of which are incorporated herein by reference.

BACKGROUND OF THE INVENTION

1. Field of the Invention

The present invention relates to an engine control system for a vehicle. The system has an idling stop and automatic restart feature.

2. Description of Related Art

JP-A-58-166165 discloses an engine control system that engages a lock-up clutch of a torque converter and stops fuel supply to the engine when the vehicle in a deceleration and vehicle speed is reduced gradually. As a result, the engine is kept in rotation by directly connecting a crankshaft of the engine and an automatic transmission. It is possible to improve fuel economy.

In this case, it is normal to prevent engine stall by releasing the lock-up clutch and restarting fuel supply when the engine speed is reduced to a predetermined value higher than an idling engine speed in a state of cutting fuel.

JP-A-8-189395 has proposed an engine automatic starting and stopping system for reducing an amount of fuel consumption more than the above-described conventional technology by carrying out a control of cutting fuel while bringing a clutch into a connected state during a time period of establishing an automatic stopping condition of an engine even in the case in which a fuel cut control condition is not established and automatically stopping the engine by releasing the clutch when a clutch releasing condition is established during the time period of establishing the automatic stopping condition of the engine.

According to the engine automatic starting and stopping system, the engine is automatically stopped in running and therefore, when there is used a brake apparatus for carrying out assistance with negative pressure of an intake pipe of the engine as a power source, operability of the brake is deteriorated in running when the engine is being stopped.

With respect to the problem, when there is used a way of thinking of JP-A-58-30438/1983, negative pressure of the brake apparatus can be ensured without operating an electric negative pressure pump by detecting booster negative pressure of the brake apparatus and ensuring the brake negative pressure by restarting the engine when the negative pressure becomes equal to or smaller than a predetermined value.

However, according to the method, there is a time lag in restarting the engine and therefore, there is a case in which booster negative pressure sufficient for operating the brake cannot be ensured in rapid braking operation while stopping the engine in running.

SUMMARY OF THE INVENTION

It is an object of the present invention to provide an automatic engine stop and start system that is capable of supplying sufficient negative pressure for a brake device.

It is another object of the present invention to provide an automatic engine stop and start system that is capable of restarting the engine before negative pressure is decreased below a predetermined threshold.

According to an aspect of exemplary embodiment of the present invention, an automatic engine stop and start system has negative pressure detecting means for detecting a negative pressure for assisting a brake booster, braking operation detecting means for detecting a braking operation of a driver, and an engine controller for automatically stopping or starting the engine under establishment of a predetermined condition of the engine based on an input signal. The engine controller automatically starts the engine when it is determined that there is carried out a predetermined braking operation for bringing about, as a result, a situation in which the booster negative pressure is estimated to be smaller than a predetermined threshold based on the booster negative pressure and the braking operation.

That is, according to the constitution, the combination of the booster negative pressure and the braking operation is checked with previously stored memory information, it is determined whether the combination is accompanied by a concern of bringing about a reduction in the booster negative pressure effecting adverse influence on the braking operation and when there is the concern, the engine is restarted. Thereby, even when the booster negative pressure is provided with a value sufficiently withstanding a certain kind of the braking operation, in the case in which there is a possibility of effecting adverse influence on the braking operation by carrying out the predetermined braking operation (for example, rapid braking or high speed repeated braking), the engine is restarted and therefore, the engine can be restarted before the booster negative pressure is reduced as a result of the predetermined braking operation. As a result, without awaiting for delay time for restarting the engine, which is brought about when the engine is restarted by simply monitoring the booster negative pressure and when needed (when a reduction in the booster negative pressure needs to restart the engine), the engine can swiftly be restarted before the booster negative pressure is actually reduced and a deterioration in the braking operation can be prevented.

According to an aspect of exemplary embodiment of the present invention, a controller automatically start the engine when there is carried out an operation in which a brake depressing amount is equal to or larger than a predetermined value as the predetermined braking operation under a situation in which the booster negative pressure is equal to or smaller than a predetermined value. That is, under the situation in which the booster negative pressure is reduced to some degree, the engine is restarted with respect to the brake depressing operation having a deep depression significantly reducing the booster negative pressure. Therefore, even when the brake depressing amount is increased, a drawback by delay in restarting the engine can be resolved.

The controller may automatically start the engine when there is carried out an operation in which a rate of changing a brake depressing amount is equal to or larger than a predetermined value as the predetermined braking operation under a situation in which the booster negative pressure is equal to or smaller than a predetermined value. Thereby, there can be resolved occurrence of a failure in assisting the braking operation caused by braking operation for bringing about a rapid reduction in the booster negative pressure such as rapid braking or pumping braking significantly consuming the booster negative pressure under a state in which the booster negative pressure is proximate to an engine restarting limit.

The controller may automatically start the engine when there is carried out an operation in which an accumulated change amount of a brake depressing amount during an immediately proximate predetermined time period is equal to or larger than a predetermined value as the predetermined braking operation under a situation in which the booster negative pressure is equal to or smaller than a predetermined value.

That is, the accumulated amount is brought into a close positive correlated relationship with an amount of reducing the booster negative pressure and therefore, when the accumulated change amount of the brake depressing amount significantly consuming the booster negative pressure is large in the state in which the booster negative pressure is proximate to the engine restarting limit, by restarting the engine with respect to the braking operation, swift engine restarting can be realized and a drawback caused by a delay in restarting the engine can be resolved.

The controller may estimate the booster negative pressure when the brake depressing amount is made to be smaller than a current value thereof by a predetermined amount from the current booster negative pressure and the current brake depressing amount. The controller may start the engine when the estimated booster negative pressure is smaller than the predetermined threshold.

That is, according to the constitution, in the pumping operation of the brake repeating to depress the brake and relieve the brake, the booster negative pressure in stopping the engine is mostly consumed and the driver feels a strange feeling in depressing the brake. Hence, when the engine is restarted by detecting a reduction in the booster negative pressure in relieving the brake, the strange feeling in depressing the brake thereafter can be resolved swiftly.

According to an aspect of exemplary embodiment of the present invention, an automatic engine stop and start system has negative pressure detecting means for detecting a negative pressure of a negative pressure source generated by an engine or an apparatus driven by the engine and supplied to a brake booster for assisting a braking operation, master cylinder pressure detecting means for detecting a pressure of a brake master cylinder, braking operation detecting means for detecting the braking operation of a driver, and a controller for automatically stopping or starting the engine under establishment of a predetermined condition of the engine based on an input signal. The controller automatically starts the engine when it is determined that there is carried out a predetermined braking operation for bringing about. As a result, a situation in which the booster negative pressure is estimated to be smaller than a predetermined threshold based on the negative pressure of the negative source, the pressure of the brake master cylinder and the braking operation.

The constitution is preferable to a system that does not have a booster negative pressure detecting sensor. According to the constitution, before stopping the engine, the booster negative pressure is estimated by the negative pressure of the negative pressure source (for example, negative pressure at an intake pipe (also referred to as intake negative pressure)), the brake operating state and the hydraulic pressure of the master cylinder. Further, there is calculated an amount of consuming the booster negative pressure by the braking operation in stopping the engine thereafter from the estimated value of the booster negative pressure, thereby, the booster negative pressure in stopping the engine can be estimated. For example, the amount of consuming the booster negative pressure is estimated based on an amount of changing the brake depressing amount in stopping the engine. The booster negative pressure in stopping the engine is estimated from the amount and the booster negative pressure immediately before stopping the engine.

The braking operation detecting means may comprise a brake depressing amount sensor.

The system may further include vehicle speed detecting means for detecting a vehicle speed. The controller may adjust the predetermined threshold in accordance with the vehicle speed. That is, the smaller the vehicle speed, the smaller the braking force necessary for the braking operation and therefore, when the predetermined threshold is changed to provide a positive correlated relationship with the vehicle speed, fuel cost can be promoted by restraining to restart the engine when the vehicle speed is small.

According to an aspect of exemplary embodiment of the present invention, an automatic engine stop and start system has a brake system having a brake booster for assisting a braking operation of a driver by using a negative pressure generated by an engine or an apparatus driven by the engine, and a controller for automatically stopping or starting the engine under establishment of a predetermined condition of the engine based on an input signal. The system further comprises downward road detecting means for detecting that a vehicle runs on a downward road. The controller prohibits the engine from being stopped in running on the downward road.

That is, when the vehicle is running on the downward road, braking force necessary for decelerating the vehicle becomes larger than that in running on a flat road. Therefore, according to the brake negative pressure sufficient for operating the brake, the booster negative pressure is consumed more than in the case of running on the flat road. Hence, on the downward road, by prohibiting to stop the engine (signifying to restart the engine when the engine is stopped), the booster negative pressure is ensured firmly and sufficiently and a drawback in the braking operation in running on the downward road caused by a delay in restarting the engine can be prevented. Further, "prohibit to stop the engine" according to the invention includes engine restarting when the engine is stopped.

The downward road detecting means may determine the downward road when a detected inclination of the vehicle is larger than a predetermined inclination threshold. Thereby, downhill (downward road) is determined by the inclination of the vehicle and therefore, the downhill can firmly be determined.

The downward road detecting means may detect the downward road based on a detected running acceleration and a detected brake depressing amount.

That is, in comparing the flat road and the downward road, even with the same braking force, the deceleration degree of the vehicle becomes smaller in the case of the downward road. Further, in the case of a steep downward road, even when the brake is operated, there is a case of accelerating the vehicle. According to the constitution, based on the above-described fact, the downward road is detected by the amount of depressing the brake and a rate of changing the vehicle speed and therefore, a vehicle inclination sensor is not needed and the constitution can be simplified.

The system may further comprise vehicle speed detecting means for detecting a vehicle speed. The controller predominantly prohibits the automatic stopping of the engine when the vehicle speed falls in a predetermined range after restarting the engine in running the vehicle. That is, when automatic stopping of the engine is prohibited during a time period after restarting the engine in running the vehicle for ensuring the brake negative pressure until the vehicle is stopped, frequent stopping and restarting of the engine is prevented and drive feeling can be promoted.

The system may further comprise hydraulic pressure controlling means capable of controlling a brake hydraulic pressure, wherein the controller generates a braking force by directly controlling the brake hydraulic pressure by instructing the brake hydraulic pressure controlling means when information with regard to a failure in starting the engine is inputted after instructing to start the engine.

Further, the information with regard to the failure in starting the engine can be determined, for example, by the fact that the booster negative pressure is equal to or smaller than a predetermined value after elapse of a predetermined time period from instructing to restart the engine. That is, according to the constitution, when the engine fails to restart by some cause although the engine is instructed to restart, in the case of carrying out the braking operation, the vehicle is firmly stopped by directly controlling the brake hydraulic pressure and therefore, reliability in braking can further be promoted. Further, in controlling the brake hydraulic pressure, there can be driven a hydraulic actuator used in ABS, traction control, brake assisting or the like.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

First Embodiment

Figure 1:
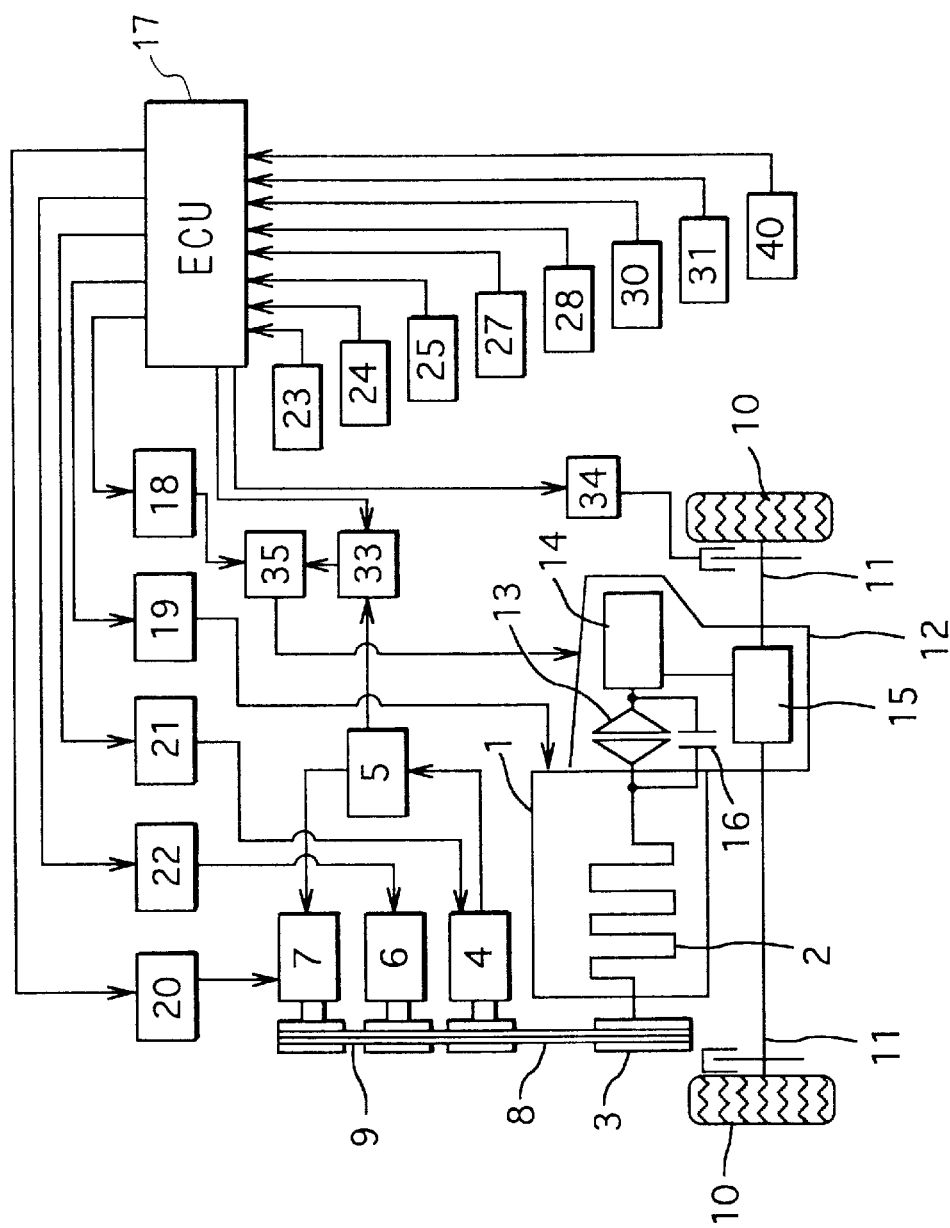
FIG. 1 is a block diagram showing an automatic stop and start system according to a first embodiment of the present invention.

FIG. 1 shows a constitution of an automatic engine stop and start system of the first embodiment. An engine 1 has a crankshaft 2, and a crank pulley 3 attached to an end of the crankshaft 2. The crankshaft 2 drives a generator 4 such as an alternator. A battery 5 is charged by power generated by the generator 4. The crankshaft 2 drives a compressor 6 for an air-conditioner. A starter 7 is operative to start the engine 1. The crank pulley 3 is connected with pulleys attached on the generator 4, the compressor 6, and the starter 7 via a single piece of a belt 8. The pulleys and the belt 8 form a power transmission mechanism 9 that is a normally engaged type and has more or less flexibility. The belt 8 may be replaced with a chain or the like constituting a functionally equivalent transmission device. The starter 7 may be a starter-generator that can works either a starter and a generator.

The crankshaft 2 is operatively connected with Left and right drive wheels 10 and 10 via left and right axles 11 and 11, and an automatic transmission 12. The automatic transmission 12 is well known type, and has a hydraulic type torque converter 13 having a pump and a turbine, a transmission 14, and a final stage speed reducing gear train 15. The transmission 14 comprises a plurality of gear trains, and hydraulic clutches. The final gear train 15 includes a differential gear train. The automatic transmission 12 is provided with a lock-up clutch 16 in parallel with the torque converter 13. The lock-up clutch 16 provides direct transmission means for carrying out transmission directly and mechanically by shortcircuiting the torque converter 13 such that power loss of the torque converter 13 by fluid is reduced in a steady-state running state at high speed. The transmission 14 can be controlled to a neutral state arbitrarily by transmission controlling means, mentioned later.

The automatic transmission 12 may be an automatic transmission having a constitution in which a transmission state between the crankshaft and the drive wheel can be controlled at least in two states of a directly connected state and a state of cutting torque transmitted from the drive wheel in the direction of the crankshaft by electronic controlling means regardless of a constitution having the hydraulic type torque converter 13. For example, the automatic transmission 12 including the transmission of the normally engaged type, may be constituted by a structure of cutting torque from the drive wheel in the direction of the crankshaft at a specific speed change stage or a structure connected in series with a control clutch of an electromagnetic clutch or the like controllable by electronic controlling means before or after a constitution in correspondence with the transmission 14 for controlling the transmission state between the crankshaft 2 and the drive wheel 10 to a directly connected or cut state by the clutch.

An electronic control unit (ECU) 17 for automatically stopping and restarting the engine is mounted on the vehicle. The ECU 17 provides a controller. The ECU 17 outputs instruction signals for automatically stopping or restarting the engine 1. The ECU 17 is constituted by at least one piece of microprocessor, memories of ROM and RAM and the like connected thereto, a clock device, input/output ports and the like similar to normal ECU. The ECU 17 carries out operation based on signals inputted from detecting means of sensors, switches and the like, and maps set by ROM and the like. The ECU 17 outputs the instruction signals in accordance with a result of the operation. Therefore, the ECU 17 is inputted with signals indicating operational states of the engine 1 and the vehicle from detecting means provided at the respective portions of the vehicle and the engine 1. The ECU 17 outputs the instruction signals of the result of the operation to related controlling means constituting individual driving devices of a number of apparatus.

A further detailed explanation will be given of controlling means for driving desired apparatus by receiving the instruction of the ECU 17 as follows.

Numeral 18 designates controlling means for the automatic transmission 12. The controlling means 18 controls the automatic transmission 12 by outputting instruction to a hydraulic control mechanism 35. Similar to the normal constitution, the controlling means 18 can switch gear trains of the transmission 14 by operating hydraulic clutches and the like at inside of the automatic transmission 12. The controlling means 18 carries out connecting and disconnecting control of the lock-up clutch 16 constituting the direct transmitting means by receiving instruction from the ECU 17 at any time. In the case of using the above-described series connected control clutch, the controlling means 18 provides means for connecting and disconnecting the control clutch.

Numeral 19 designates controlling means of the engine 1 for controlling operating conditions such as fuel supply and ignition timing. Numeral 20 designates controlling means of the starter 7. The controlling means 20 and the starter 7 are arranged so that the starter 7 carries out restarting operation by driving the crankshaft 2, even in the case in which the engine 1 is not completely stopped.

Numeral 21 designates controlling means for controlling an amount of a power generation of the generator 4. The power generation of the generator 4 can be controlled thereby. Further, there is provided controlling means 22 of the compressor 6 that is needed when the air-conditioner is used. By operating the controlling means described above, load acting on the crankshaft 2 can be increased or decreased temporarily.

Further, FIG. 1 exemplifies several detecting means for detecting signals indicating the operational states of the engine 1 and the vehicle, which are necessary for the ECU 17 for carrying out such a control.

Numeral 23 designates a vehicle speed sensor for detecting a vehicle speed VS.

Numeral 24 designates a brake depressing amount sensor for detecting a brake depressing amount BS. The brake depressing amount sensor provides brake depressing amount detecting means for detecting a depressing amount of a brake pedal, not illustrated, operated by a driver of the vehicle. The brake depressing amount sensor 24 also provides braking operation detecting means. The brake depressing amount sensor 24 is replaceable with a sensor that detects a brake depressing amount, a brake depressing angle, or a magnitude of force of depressing brake.

Numeral 25 designates detecting means of a depressing amount AS of an accelerator pedal operated by the driver. The depressing amount is replaceable with an accelerator opening degree. According to the first example, it is not necessary to accurately detect the depressing amount of the accelerator pedal, it is sufficient when it can be detected whether the depressing amount exceeds a predetermined amount or not. Therefore, an accelerator switch operable to the accelerator pedal, can be the detecting means 25.

Numeral 27 designates turn signal detecting means for detecting operation of a turn signal lamp. A pair of turn signal switches can be used as the turn signal detecting means 27. That is, the detecting means may be connected such that an electric signal is inputted to the ECU 17 when either of the left and right turn signal switches 27 is made ON.

Numeral 28 designates road inclination angle detecting means for detecting an inclination angle of a road on which a vehicle runs. For example, there can be provided a switch made ON when an inclination angle of a pendulum capable of freely pivoting exceeds a predetermined value at a pertinent location of the vehicle to assign to the purpose.

Numeral 30 designates detecting means for detecting an operational state of a parking brake. The detecting means may be a switch made ON when the parking brake is brought into an engaged state and therefore, a switch of this kind provided in the normal vehicle may be connected to the ECU 17 as it is as a sensor.

Numeral 31 designates detecting means 31 for detecting a revolution number of the engine 1. Herein after the revolution number of the engine 1 is referred to as an engine speed NE. For example, when the engine 1 is a spark ignition engine such as a gasoline engine, the engine speed NE can be calculated by counting a number of pulses of ignition signals generated within unit time by the ECU 17.

Numeral 33 designates an electric hydraulic pump that is communicated with the hydraulic control mechanism 35. The pump 33 is driven by a motor powered by the battery 5 under control of the ECU 17. The ECU 17 controls the pump 33 in order to ensure operational hydraulic pressure of the hydraulic control mechanism 35 during the engine 1 is stopped.

A brake system 34 uses intake negative pressure of the engine when the engine 1 is rotated. The operational hydraulic pressure of the hydraulic control mechanism 35 is supplied by a hydraulic pump, not illustrated, attached to the crankshaft 2 of the engine 1, when the engine 1 is rotated.

Further, a detecting means may be attached, which is capable of directly detecting the operational state that can be indirectly detected by the above-described detecting means. For example, a sensor for directly detecting a state of connecting and disconnecting the lock-up clutch 16 and the like can be provided as necessary. Otherwise, controlling means for controlling to connect and disconnect fuel supply to the engine 1, controlling means for controlling to make an ignition device ON-OFF and the like are provided. Control of cutting fuel supply, recovering fuel supply and the like carried out by these controlling means, is carried out by controlling the engine controlling means 19 by the ECU 17. Therefore, these controlling means are included in parts of the engine controlling means 19.

Numeral 40 designates a pressure sensor for detecting negative pressure PB of a brake booster, not illustrated, included in the brake system 34, which is also referred to as a booster negative pressure sensor.

A usual vacuum assist system is used in the brake system 34. As is well known conventionally, the brake system 34 of the vacuum assist system is provided with the brake booster supplied with the negative pressure. If the brake pedal is operated, the negative pressure of the brake booster drives a master cylinder. Then, the master cylinder supplies hydraulic pressure to wheel cylinders via brake fluid conduits. The wheel cylinders brake the wheels.

Figure 2:
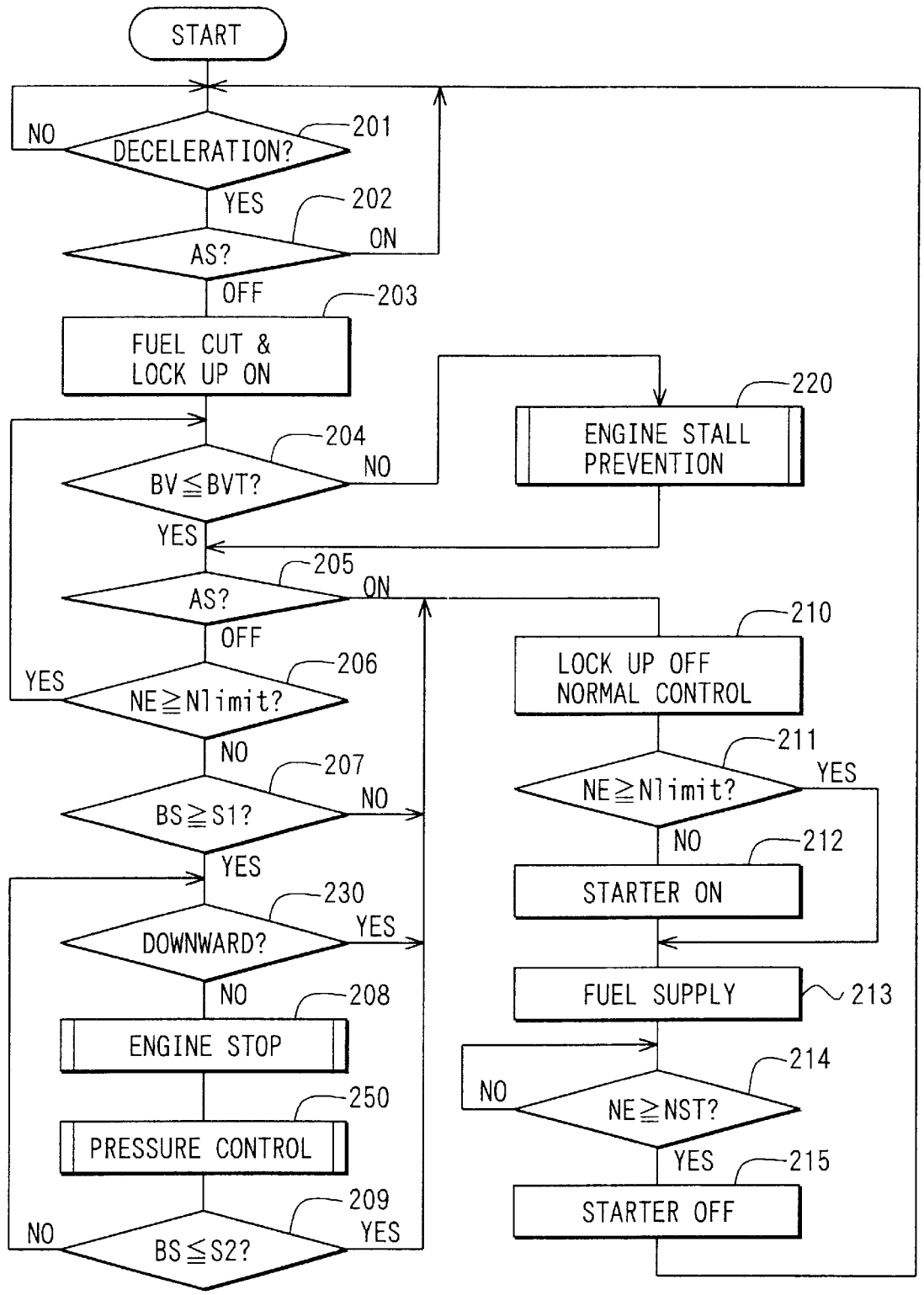
FIG. 2 is a flowchart showing automatic stop and start process according to a first embodiment of the present invention.

An explanation will be given of automatic stopping and restarting operation according to the embodiment in reference to a control program of a main routine shown in a flowchart of FIG. 2.

When the vehicle is brought into a decelerated state in which the depressing amount of the accelerator pedal (accelerator opening degree) by the driver becomes null and the vehicle speed is reduced in running and a detected signal of the increasing and reducing speed detecting means 23 becomes equal to or smaller than a negative predetermined value, the electronic ECU 17 determines that the vehicle is brought into the decelerated state at step 201 and the operation proceeds to step 202.

At step 202, it is detected that the accelerator switch (AS) 25 is brought into an OFF state. When it is confirmed that the accelerator pedal is not depressed, the operation proceeds to step 203 and the ECU 17 controls the engine controlling means 19 to instruct fuel cut and fuel recovery prohibition at the engine 1. Simultaneously therewith, the ECU 17 controls the transmission controlling means 18 to make the lock-up clutch 16 (or a control clutch or the like in correspondence therewith as described above) of the automatic transmission 12 ON (connected state) to continue to rotate the crankshaft 2 of the engine 1 which does not generate torque by cutting fuel supply by being conversely driven by the drive wheel 10 and the axle 11. Further, when the decelerated state is not detected at step 201, or when depression of the accelerator pedal is detected at step 202, the operation returns to before step 201 and repeats the determination.

At step 204, it is determined whether brake depressing speed BV calculated at the ECU 17 based on a detected signal of the brake depressing amount detecting means 24, is equal to or smaller than a predetermined value BVT. When the determination is NO (brake depressing speed is equal to or larger than the predetermined value), there is brought about a rapidly braked state and therefore, the operation proceeds to an engine stall preventing subroutine program 220 and when the determination is YES, it is confirmed again at step 205 that the accelerator switch 25 is made OFF (accelerating operation is not carried out), thereafter, the operation proceeds to step 206 and it is determined whether the engine speed NE is equal to or larger than a predetermined engine speed Nlimit.

When the accelerator switch (AS) 25 is made ON at step 205, the operation proceeds to step 210. At step 210, the lock-up clutch 15 is made OFF (opened state), and a transmission control is resumed to a normal control. Thereafter, when the engine speed NE is equal to or larger than Nlimit in determination at step 211 (YES), the operation proceeds to step 213, fuel supply is restarted and the engine is restarted only thereby. When the engine speed NE is equal to or smaller than Nlimit (NO) at step 211, the operation proceeds to step 212, the starter 7 is driven. Thereafter, the engine 1 is restarted with restarting of fuel supply. At step 214, it is determined that whether the engine speed NE becomes equal to or larger than a predetermined value NST that indicates the engine start is completed. Then, the operation proceeds to step 215 and the starter 7 is made to stop driving.

In this case, Nlimit is a predetermined value having the following meaning. Generally in an engine of a reciprocating type, the engine speed passes through a resonance region until the engine speed is reduced and the engine is stopped and therefore, at such an occasion, there is generated vibration unpleasant for a passenger having large amplitude by resonance of the engine and the vehicle body of the vehicle. Nlimit refers to an engine speed produced by adding a maximum engine speed of the resonance region and an amount of reducing the engine speed anticipated during a time lag from establishing an engine stopping condition until a control of stopping the engine is actually started. When the engine speed is reduced to reach Nlimit, by carrying out a control particular to the invention for swiftly passing the successive resonance region as mentioned later, the vibration generated at the resonance region can be alleviated.

When the engine speed NE is equal to or larger than the predetermined engine speed Nlimit at step 206, that is, the engine speed NE is not reduced to Nlimit, the operation returns to before step 204 and the determination is repeated. The deceleration is progressed in the state of cutting fuel and the engine speed is also reduced.

When the determination is NO (engine speed passes through Nlimit and becomes proximate to the resonance region) at step 206, the process proceeds to step 207. At step 207, it is determined whether the depressing amount BS of the brake is equal to or larger than a first predetermined value, in this case, engine speed stopping threshold S1. The first predetermined value is a value anticipated to depress the accelerator pedal when the driver stops the vehicle and is set as, for example, a value capable of controlling creep torque which is generated when the accelerator pedal is not depressed. When determination is YES (equal to or larger than the predetermined value) at step 207, it is determined that the driver intends to stop the vehicle and the operation proceeds to step 230.

At step 230, it is determined whether the road is downhill, that is, a downward road and when the road is downward road, the operation proceeds to step 210 and the engine is restarted.

Thereby, by prohibiting to stop the engine in running on the downward road, the intake negative pressure is always supplied to the brake booster and therefore, stop of supply thereof can be avoided. Therefore, there can previously be prevented occurrence of a drawback that the booster negative pressure is significantly consumed by the braking operation when the vehicle runs on the downward road, the booster negative pressure is reduced to exceed a necessary level and the control operation is deteriorated.

Here, determination of the downward road in step 230 (downward road detecting means according to the invention), is carried out as follows. It can be readily understood that the determination steps can easily be carried out in a current automobile and therefore, illustration of a flowchart will be omitted.

First, a first determining method is to determine the downward road when the road inclination angle detected by the road inclination angle detecting means 28 is equal to or larger than a predetermined value. For example, there is already well known that road inclination angle detecting means 28 per se of this kind for detecting the inclination angle of a free oscillating pendulum by a noncontact limit switch or the like and therefore, a specific explanation thereof will be omitted.

Figure 15:
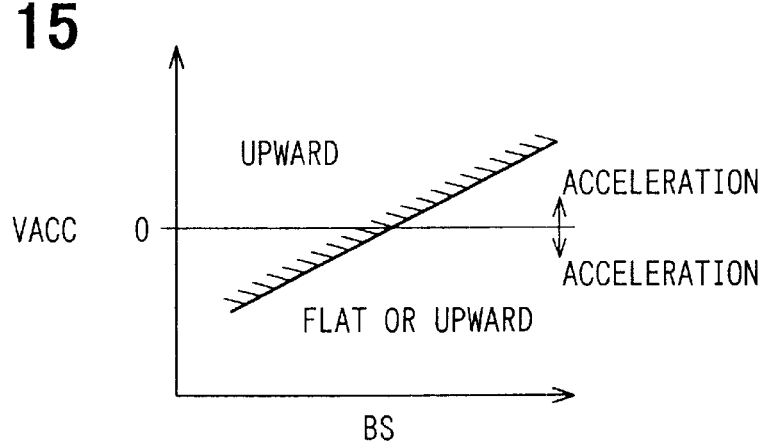
FIG. 15 is a graph showing a relationship between a vehicle acceleration and a brake depressing amount.
Figure 16:
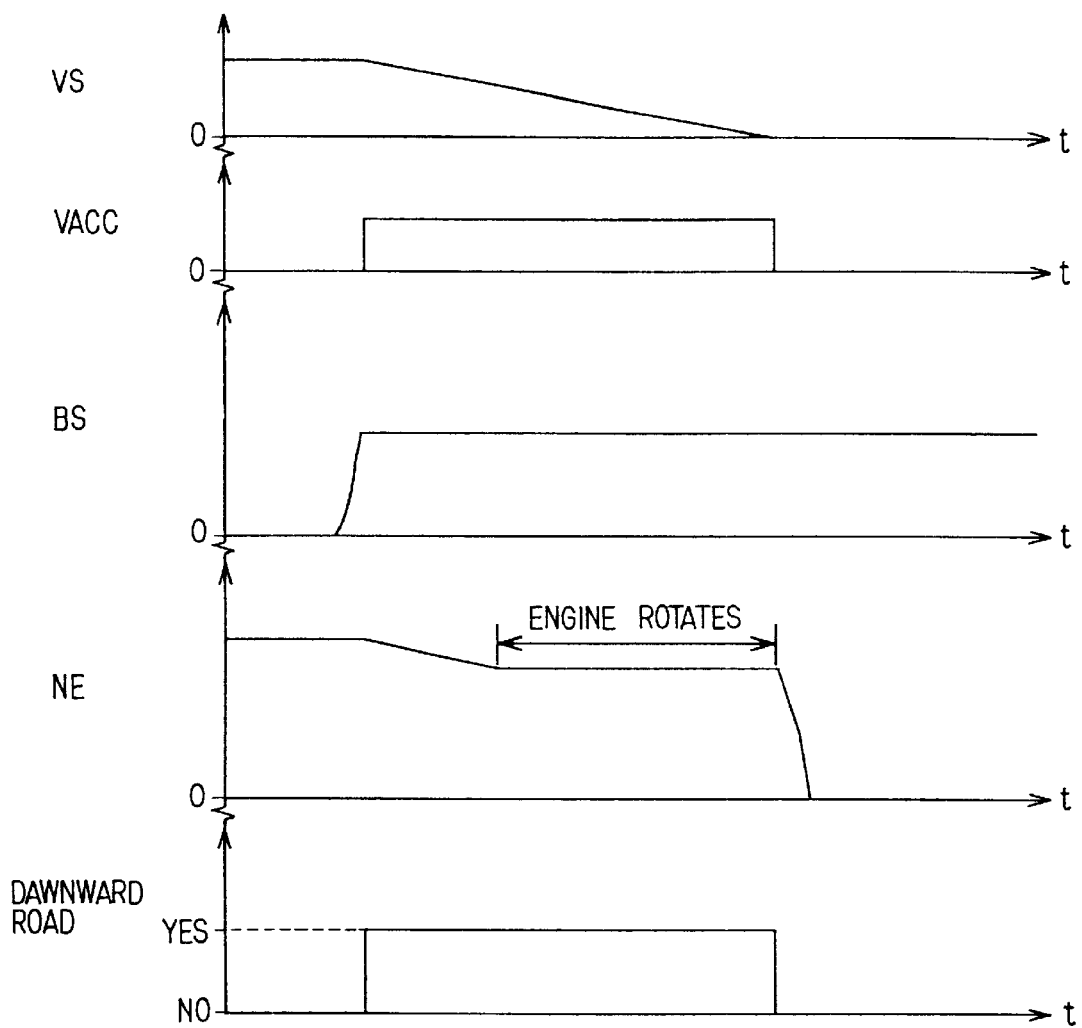
FIG. 16 is a time chart showing operating conditions under a control of the third embodiment of the present invention.

A second determining method is to determine the downward road based on running acceleration VACC and a brake depressing amount BS when a deceleration rate is less than a predetermined value despite that the brake depressing amount is equal to or larger than a predetermined amount. That is, there is previously stored a map showing a relationship among the running acceleration VACC, the brake depressing amount BS and an inclination angle (refer to FIG. 15, FIG. 16) and the inclination angle is calculated by putting the detected running acceleration VACC and the brake depressing amount BS to the map. Thereby, the inclination angle sensor can be omitted.

When the downward road is not determined at step 230, the operation proceeds to step 208. At step 208, the ECU 17 carries out an engine stopping processing and proceeds to step 250. A subroutine program for the engine rotation stopping processing shown in step 230 corresponds to automatic stopping of the engine according to the invention.

At step 250, mentioned later, the ECU 17 carries out a subroutine for ensuring the negative pressure (also referred to as booster negative pressure, brake negative pressure) of the brake booster. At step 209, it is determined whether the depressing amount BS of the brake is equal to or smaller than a second predetermined value, engine restarting threshold S1 in this case. The second predetermined value S2 is set as a value equal to or smaller than the first predetermined value S1. When the determination is NO (depressing amount BS of brake is equal to or larger than second predetermined value S2), the driver stays to intend to stop the vehicle even after the processing of stopping to rotate the engine 1 has been carried out and therefore, the operation returns to step 208 again, the determination and the engine rotation stopping processing is continued and the engine 1 is completely stopped or the stopping state is maintained.

Naturally, in the case in which the accelerator switch 25 is made ON, that is, the driver depresses the accelerator pedal at step 205, in the case in which the depressing amount of the brake becomes equal to or smaller than the first predetermined value S1 (NO) in the determination at step 207, it seems that the intention of the driver is changed from stopping the vehicle to continuation of running or reaccelerating the vehicle. Even in the case in which the determination at step 209 after carrying out the engine rotation stopping processing, becomes YES (the brake depressing amount is equal to or smaller than the second predetermined value S2), it seems that the intention of the driver who is going to stop the vehicle is changed to reaccelerate the vehicle. Hence, in any of these cases estimating reacceleration, the operation proceeds to step 210 for increasing the engine speed by supplying fuel and restarting the engine 1 again.

When the operation proceeds to step 210, the ECU 17 immediately makes OFF the lock-up clutch 16 (or means in place thereof) via the transmission controlling mean 18 and stops maintaining to rotate the crankshaft 2 by the axle 11 to thereby enable to freely rotate the crankshaft 2. Simultaneously therewith, the control of the transmission 14 of the automatic transmission 12 by the transmission controlling means 18 is recovered to the normal control mode. Further, at step 211, it is determined whether the engine speed NE at that occasion is larger than the constant value Nlimit. When the engine speed NE is not larger (NO), at step 212 the ECU 17 starts the starter 7 by the starter controlling mean 20, drives to rotate the crankshaft 2 via the belt 8 and restarts the engine 1 by restarting supply of fuel by the engine controlling means 19 at step 213. When the engine speed NE is equal to or larger than Nlimit (YES) in the determination of step 211, the engine 1 is restarted by only restarting supply of fuel without driving the starter 7.

That is, according to the embodiment, the automatic stopping and restarting control apparatus basically avoids consumption of fuel by cutting fuel in the decelerated state of the vehicle and maintains rotation of the engine by rotation of the axle for a small time period before the vehicle is completely stopped by connecting the crankshaft of the engine and the axle. Further, when the depressing amount of the brake by the driver is equal to or larger than the first predetermined value S1, except the case of rapid braking in which the brake depressing speed is high, swift stopping processing of the engine rotation is carried out by estimating that the driver intends to stop the vehicle, when the depressing amount of the brake is reduced to be equal to or smaller than the second predetermined value S2, supply of fuel is restarted by estimating that the driver intends to reaccelerate the vehicle, restraint of the crankshaft by the axle is released, the starter is operated and the engine is rotated by a predetermined rotational number or more. Further, even when fuel is cut in deceleration, in the case in which the depressing amount of the brake is equal to or smaller than the first predetermined value S1 from the start, it is estimated that re-acceleration is going to be carried out, supply of fuel is restarted before the engine speed is reduced to the resonance region and restraint of the crankshaft by the axle is released. In this case, the starter is not operated. Naturally, operation of ensuring the booster negative pressure, mentioned later, constituting the characteristic of the embodiment, is applicable to other engine automatic stopping and restarting system.

Figure 3:
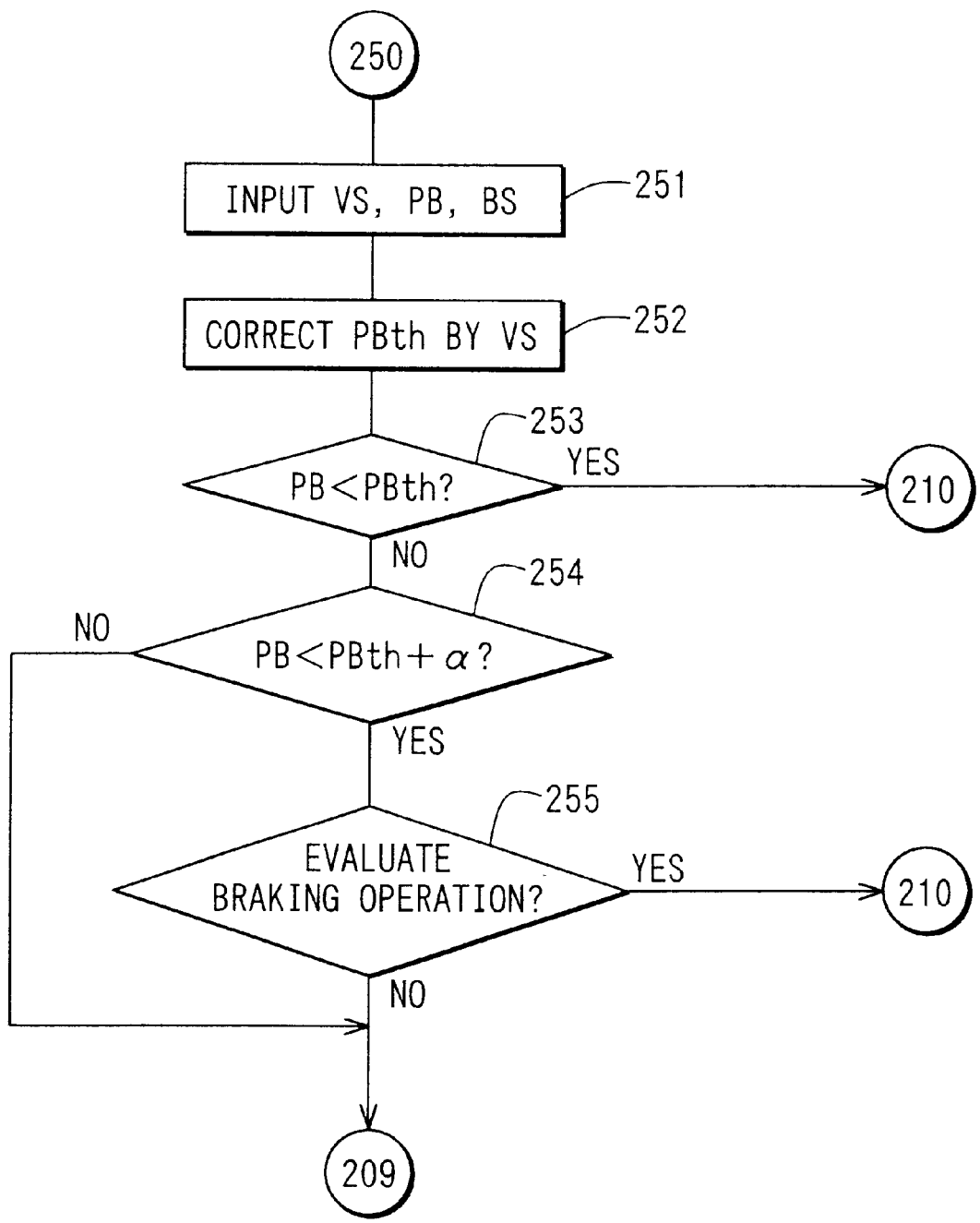
FIG. 3 is a flowchart showing detail of step 250 in FIG. 2.

Next, an explanation will be given of a booster negative pressure ensuring subroutine carrying out at step 250 in reference to a flowchart shown in FIG. 3.

First, at step 251, based on input signals from the vehicle speed sensor 23, the brake depressing amount sensor (braking operation detecting means) 24 and the booster negative pressure sensor 40, the vehicle speed VS, the booster negative pressure PB and the braking operation BS are detected. At step 252, a booster negative pressure threshold PBth is corrected based on a map for previously storing a relationship between the booster negative pressure threshold PBth and the vehicle speed VS. A description will be given later of a specific example of the braking operation to be detected.

Next, it is investigated whether the detected booster negative pressure PB is smaller than the threshold PBth (step 253). When the booster negative pressure PB is smaller, the operation proceeds to step 210 and the engine is restarted immediately without taking a consideration on the braking operation. Otherwise, it is investigated whether the detected booster negative pressure PB is smaller than the threshold PBth+α (step 254). When the booster negative pressure PB is smaller, the operation proceeds to step 255, otherwise, proceeds to step 209. Notation α designates a predetermined small value.

At step 255, a braking operation within a predetermined period is evaluated whether it lowers the booster negative pressure to the booster negative pressure threshold PBth. For instance, it is investigated whether there is carried out the braking operation with a concern that the booster negative pressure PB may become lower than the booster negative pressure threshold PBth. If such a braking operation is carried out, the operation proceeds to step 210 and the engine is restarted, otherwise, the operation proceeds to step 209.

Thereby, at a stage at which the booster negative pressure PB is slightly larger than the threshold PBth for unconditionally restarting the engine, at a stage at which there is carried out the braking operation significantly consuming the booster negative pressure PB (for example, pumping braking operation) restarting of the engine is instructed before detecting an actual reduction in the booster negative pressure PB by the braking operation and therefore, a delay in restarting the engine is shortened and a disturbance of the braking operation in the time period can be prevented.

An explanation will be given as follows of respective examples of the braking operation at step 255. The respective braking operation per se is simple and can easily be understood and therefore, illustration by a flowchart will be omitted.

First, according to a first example, when there is carried out the braking operation in which the brake depressing amount, that is, the brake depressing amount is equal to or larger than a predetermined value, it is determined that the braking operation at step 255 is carried out. That is, the operation proceeds to step 210 when the booster negative pressure PB and the brake depressing amount are read at the step 252 and a difference x between a detected value at current time and a detected value at preceding time of the brake depressing amount is equal to or larger than a predetermined value. Further, it is preferable that the preceding time value of the brake depressing amount is set to a value of the brake depressing amount at a time point at which a change in the brake depressing amount therebefore reflects to a change in the booster negative pressure PB and it is not necessarily needed that the preceding time value is a preceding time value of the routine of step 250. That is, the preceding time value is to be a value of the brake depressing amount detected a predetermined time period before the current value.

In other example, a temporary reducing amount (which will recover soon) ΔPB of the booster negative pressure PB immediately after respective braking operation by the respective braking operation, is stored to a map of the respective braking operation. Further, there is calculated a current time value of the reducing amount ΔPB of the booster negative pressure PB by the braking operation detected at current time and the current time value is subtracted from the current time value PB of the booster negative pressure PB detected at current time and a next anticipated value (PB−ΔPB) of the booster negative pressure PB is estimated. Next, when (PB−ΔPB) becomes smaller than PBth, it is determined that there is carried out the braking operation specified at step 255, the operation proceeds to step 210 and the engine is restarted. Thereby, a deficiency in assisting the braking operation by reducing the booster negative pressure PB can be avoided.

In other example, when there is carried out operation in which a rate of changing the brake depressing amount, that is, the brake depressing amount is equal to or larger than a predetermined value, it is determined that the braking operation at step 255 is carried out. That is, that speed of changing the brake depressing amount at current time is large, signifies that abrupt braking operation is currently carried out and therefore, signifies that a reduction in the booster negative pressure PB is large immediately thereafter. Hence, when the booster negative pressure PB is slightly larger than the booster negative pressure threshold PBth and the rate of changing the brake depressing amount is equal to or larger than the predetermined value, the booster negative pressure PB becomes lower than the booster negative pressure threshold PBth immediately thereafter and therefore, the engine is restarted immediately prior to an actual reduction in the booster negative pressure PB. Thereby, there can be avoided a deficiency in assisting the braking operation by reducing the booster negative pressure PB. Further, at step 255, by dividing a difference between a current time value of the brake depressing amount and a preceding time value immediately therebefore by a time difference between time points of sampling the two values, the rate of changing the brake depressing amount can be calculated. When the routine of FIG. 3 is carried out at respective constant time period, the difference between the two value becomes a value in proportion to a rate of changing the brake depressing amount with no need of dividing the difference by the time difference and therefore, the value may be used.

In other example, the automatic starting is instructed when under a situation in which the booster negative pressure is equal to or smaller than a predetermined value, an accumulated value of changing the brake depressing amount in an immediately proximate predetermined period of time is equal to or larger than a predetermined value as predetermined braking operation. That is, the accumulated amount of the brake depressing amount at the immediately proximate period of time (particularly, an accumulated amount of the braking depressing amount during a time period in which the accumulated amount is not reflected to a detected value of a booster negative pressure sensor), is brought into a close positive correlated relationship with an amount of reducing the booster negative pressure thereafter and therefore, when the accumulated change amount of the brake depressing amount significantly consuming the booster negative pressure is large in a state in which the booster negative pressure is proximate to an engine restarting limit, by restarting the engine for the braking operation, swift engine restarting can be realized and a drawback caused by a delay in restarting the engine can be resolved. Specifically, an absolute value of the change in the brake depressing amount immediately therebefore is summed up and when the summed-up value exceeds a predetermined value, the engine may be restarted.

Figure 4:
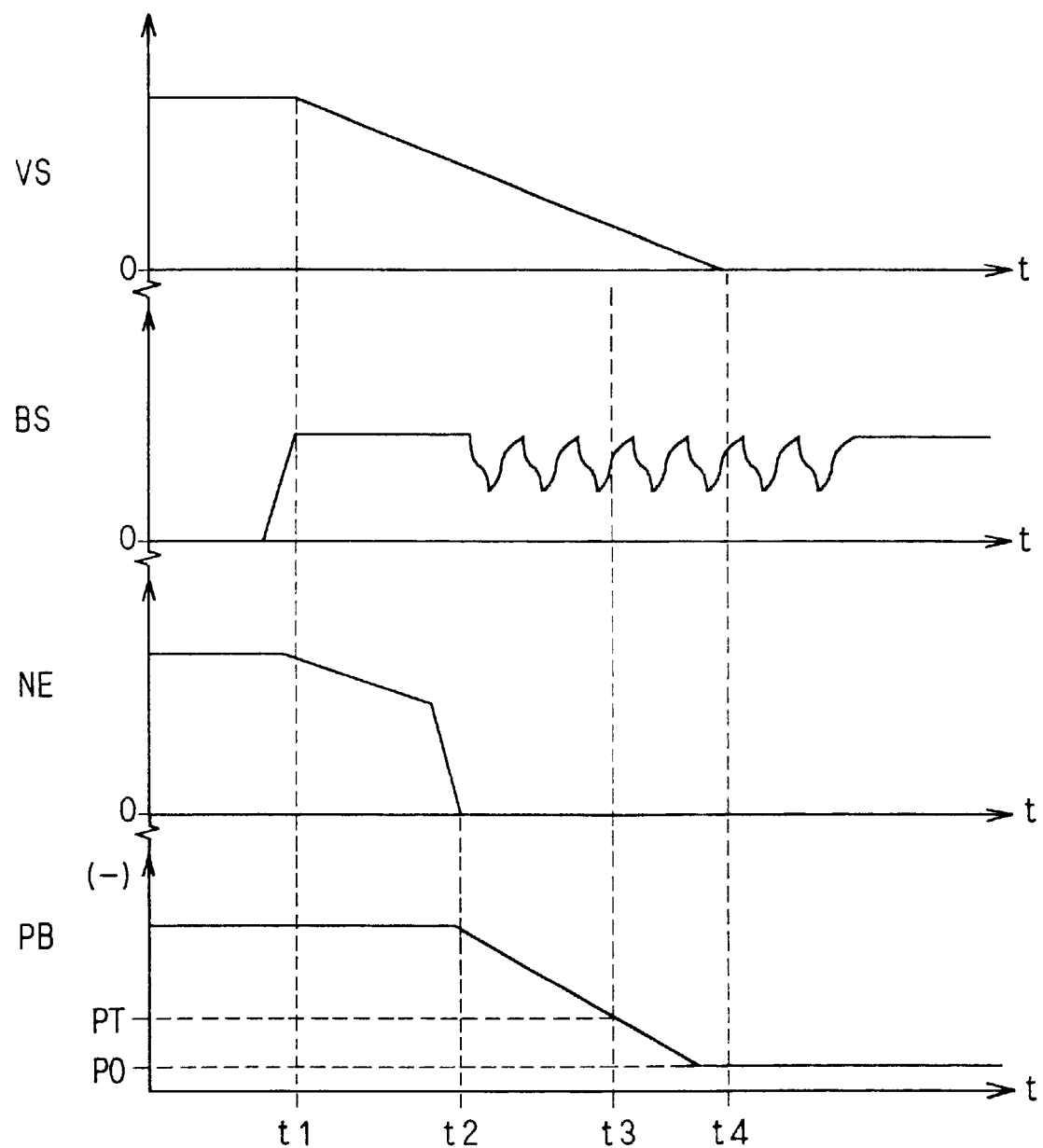
FIG. 4 is a time chart showing operating conditions under a conventional control.

In a conventional control for automatically stopping the engine, the driver may feel a strange feeling due to an insufficient negative pressure. For example, when the vehicle is run by a pattern as shown by FIG. 4. The vehicle is run in a steady-state running until time t1, and is in deceleration from time t1. Then, the engine is stopped at time t2 by an automatic engine stopping function. The booster negative pressure PB is decreased after the engine is stopped. In FIG. 4, PT indicates a lower limit negative pressure for operating the brake sufficiently, and P0 is an atmospheric pressure. The vehicle is completely stopped at time t4. When the brake is subjected to pumping operation after stopping the engine in deceleration, booster negative pressure PB is reduced. The brake negative pressure sufficient for operating the brake cannot be ensured after time t3. The driver may feel a strange feeling in the braking operation due to an insufficient negative pressure PB.

Figure 5:
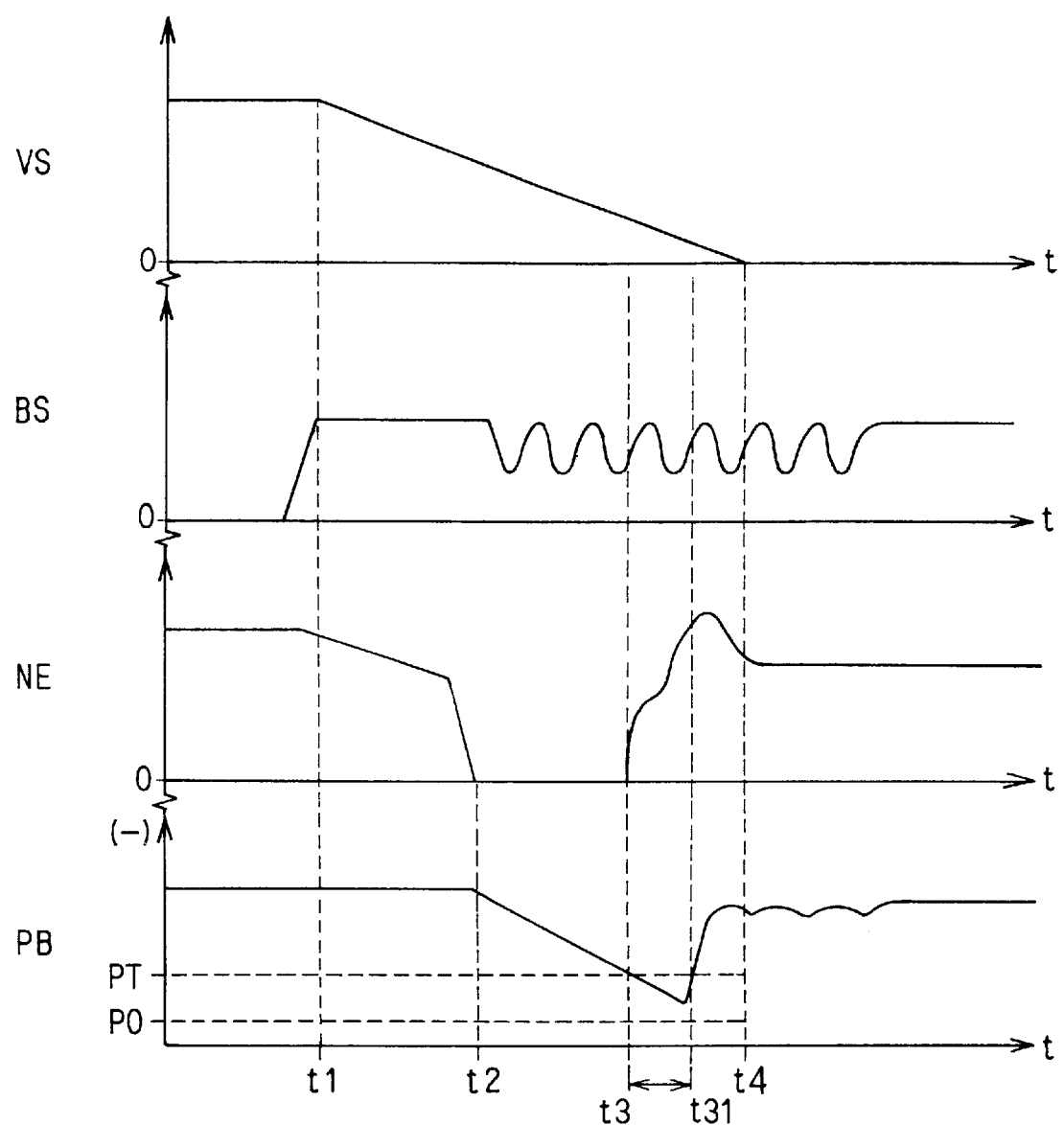
FIG. 5 is a time chart showing operating conditions under another conventional control.

In another conventional control, even if the engine is restarted, the driver may feel a strange feeling. For example, in FIG. 5, when the necessary booster negative pressure PT is large as in the case in which the driver carries out abrupt braking operation in order to ensure the booster negative pressure by restarting the engine at a stage in which the booster negative pressure becomes equal to or smaller than a predetermined value PT. The sufficient negative pressure PT cannot be ensured and there is brought about a possibility of temporarily causing the strange feeling in the braking operation between time t3 and t31. Naturally, it is possible to increase the predetermined value PT of the booster negative pressure for determining to restart the engine, however, by an increase in a frequency of restarting the engine, an effect of promoting fuel cost is reduced.

Figure 6:
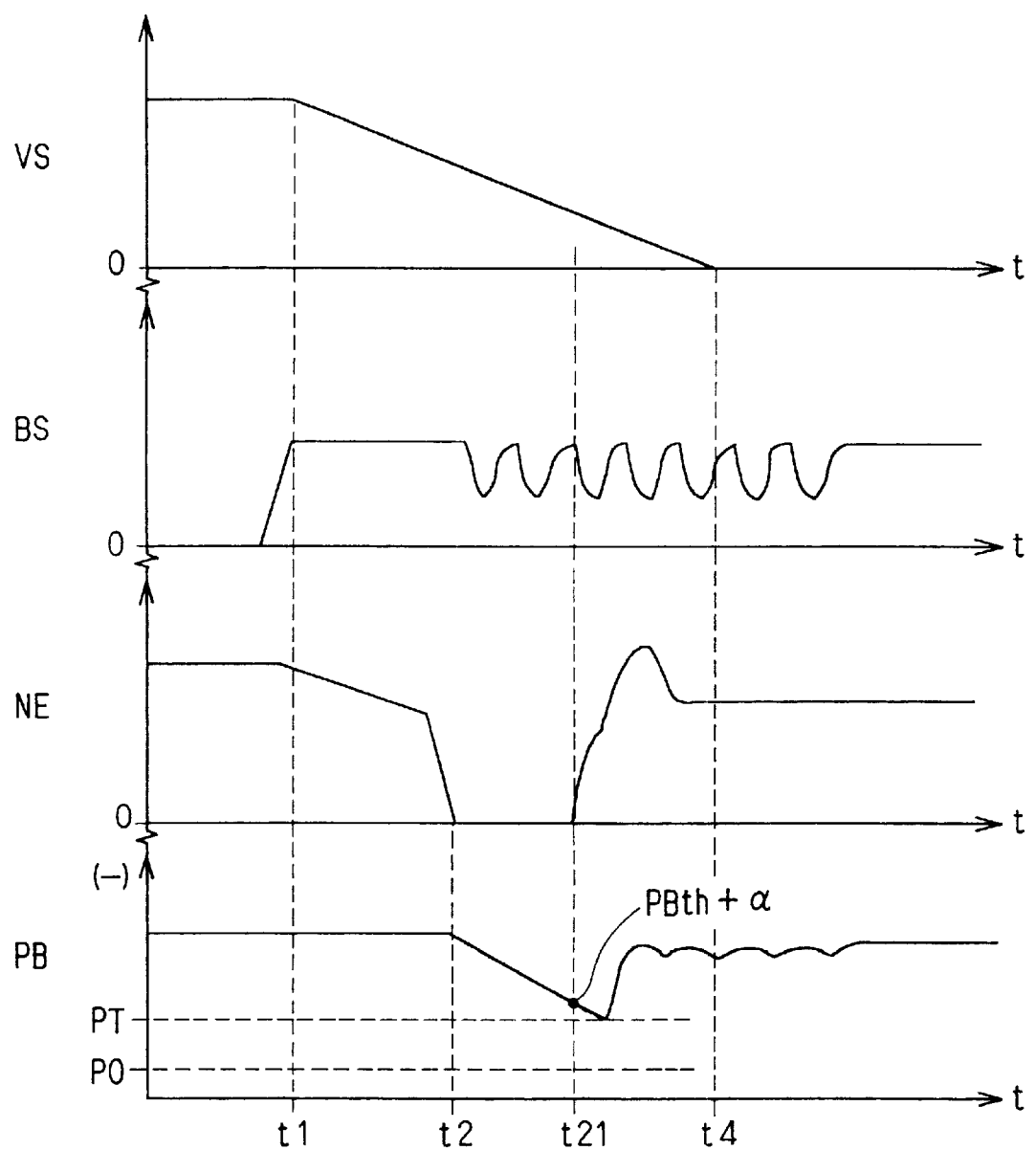
FIG. 6 is a time chart showing operating conditions under a control of the first embodiment of the present invention.

According to the first embodiment, the driver is prevented from the strange feeling in the braking operation, because the insufficiency of the booster negative pressure is effectively avoided. For example, as shown by FIG. 6, at a stage of PBth+α before the booster negative pressure PB reaches the PT, it is determined whether the engine is to be restarted in accordance with the braking operation state of the driver. The engine is restarted at time t21. The engine speed NE is increased before the booster negative pressure is lowered below the sufficient negative pressure PT, because the instruction for restarting the engine is generated in advance enough.

Figure 7:
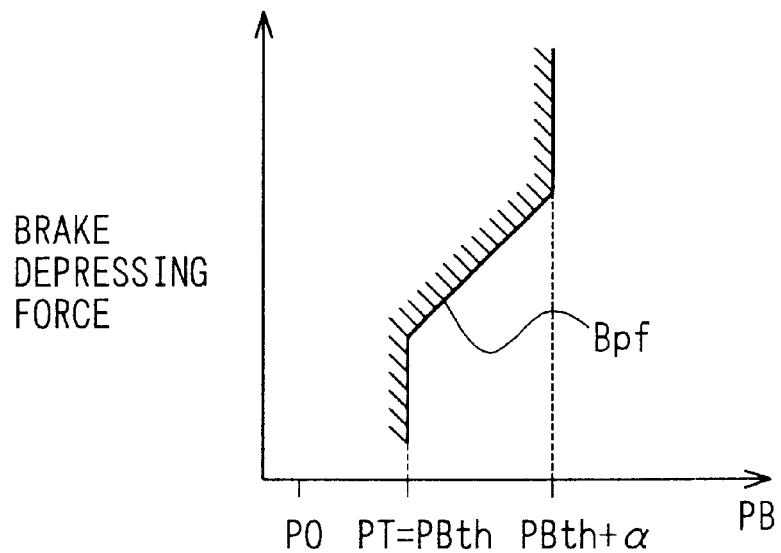
FIG. 7 is a graph showing a control characteristic according to the first embodiment of the present invention.

FIG. 7 through FIG. 10 illustrate alternative relationships between various braking operation information and a change in the booster negative pressure after elapse of a predetermined delay time period thereby. For example, in FIG. 7, the engine is restarted when the booster negative pressure PB is equal to or smaller than PBth+α and brake depressing force BF is equal to or larger than a predetermined value. The boundary Bpf for determining a restarting is defined as shown in FIG. 7. If both of the brake depressing force and the booster negative pressure enter a hatched area, the engine is restarted.

Figure 8:
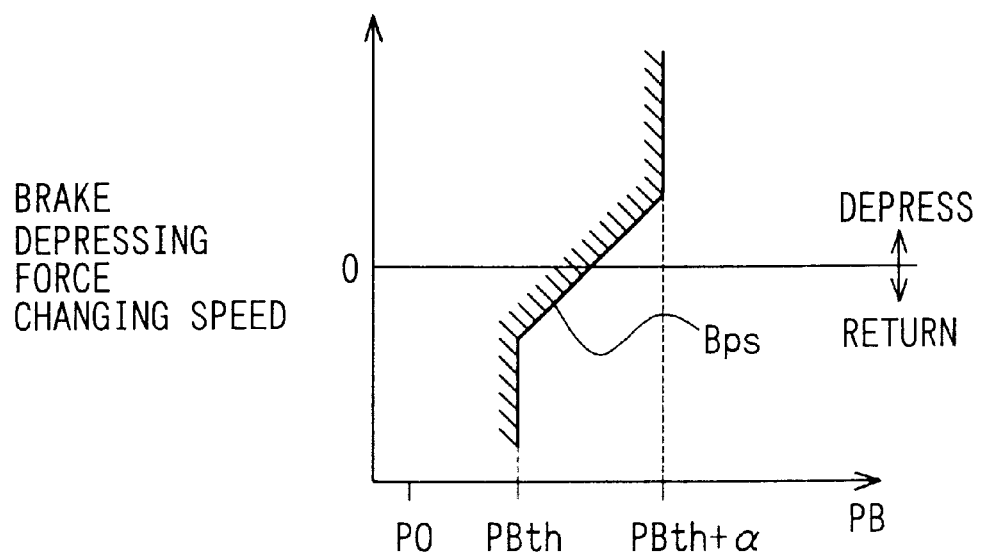
FIG. 8 is a graph showing a control characteristic according to the first embodiment of the present invention.

In FIG. 8, the engine is restarted when the booster negative pressure PB is equal to or smaller than PBth+α and brake depressing force changing speed is equal to or larger than a predetermined value. The boundary Bps for determining a restarting is defined as shown in FIG. 8. If both of the brake depressing force changing speed and the booster negative pressure enter a hatched area, the engine is restarted.

Figure 9:
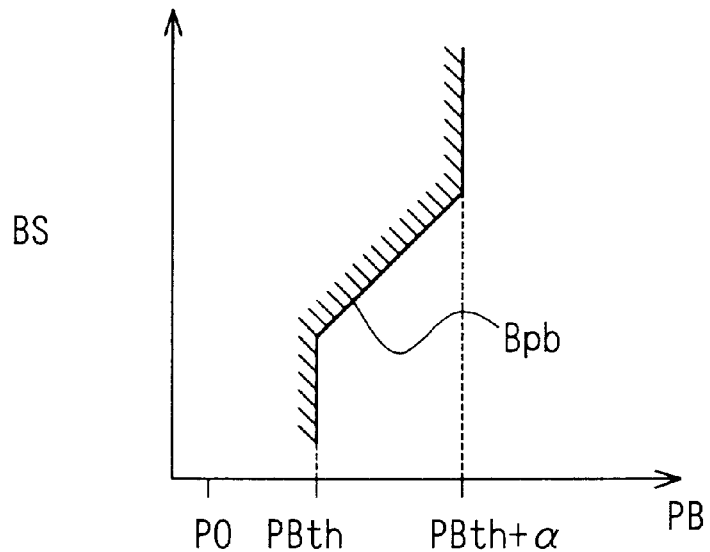
FIG. 9 is a graph showing a control characteristic according to the first embodiment of the present invention.

In FIG. 9, the engine is restarted when the booster negative pressure PB is equal to or smaller than PBth+α and the brake depressing amount BS is equal to or larger than a predetermined value. The boundary Bpb for determining a restarting is defined as shown in FIG. 9. If both of the brake depressing amount BS and the booster negative pressure PB enter a hatched area, the engine is restarted.

Figure 10:
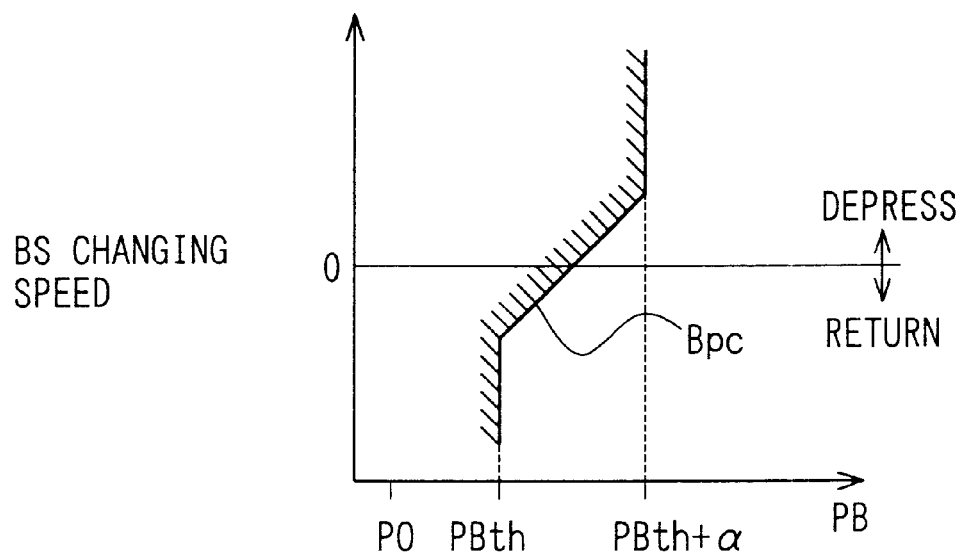
FIG. 10 is a graph showing a control characteristic according to the first embodiment of the present invention.

In FIG. 10, the engine is restarted when the booster negative pressure PB is equal to or smaller than PBth+α and speed of changing the brake depressing amount BS is equal to or larger than a predetermined value. The boundary Bpc for determining a restarting is defined as shown in FIG. 10. If both of the brake depressing amount changing speed and the booster negative pressure enter a hatched area, the engine is restarted.

Thereby, while preventing the driver from being given of the strange feeling by sufficiently ensuring the booster negative pressure also with regard to rapid braking operation of the driver, substantial promotion in the fuel cost can be achieved while preventing frequent restarting of the engine.

Second Embodiment

Figure 11:
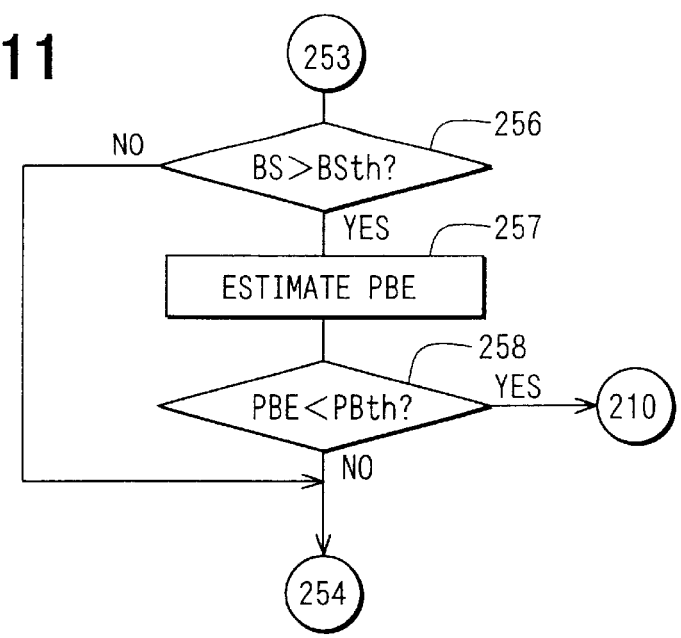
FIG. 11 is a flowchart according to a second embodiment of the present invention.

An explanation will be given as follows of an automatic engine stop and start system according to a second embodiment. The apparatus constitution and basic operation per se according to the embodiment is the same as those of the first embodiment and steps shown in FIG. 11 are added between steps 253 and 254 of the flowchart shown in FIG. 3 of the first embodiment. In the following embodiments, the same or similar elements in the first embodiment are indicated by the same reference numbers in the first embodiment, and the explanations for such elements will not be repeated.

In FIG. 11, it is determined whether the brake depressing amount BS is equal to or larger than a predetermined value BSth. When the brake depressing amount is less than the predetermined value, the operation jumps to step 254. When the brake depressing amount is equal to or larger than the predetermined value, at step 257, there is calculated an estimated booster negative pressure PBE when the brake depressing amount is relaxed from a current value by a predetermined amount, here, constituted by a constant value. The calculation may be carried out by putting the brake depressing amount or the booster negative pressure to a map previously storing a correlated relationship among the related parameters.

Next, it is determined whether the estimated booster negative pressure PBE is smaller than the predetermined threshold PBth. When the estimated booster negative pressure PBE is smaller than the threshold PBth, it is determined that there is a possibility of reducing the booster negative pressure more than the predetermined threshold PBth when relief of the pumping operation is carried out again immediately thereafter and the engine is restarted to prepare therefore. Otherwise the operation proceeds to step 254.

Thereby, when the engine is restarted by detecting a reduction in the booster negative pressure in depressing the brake again, the strange feeling in depressing the brake again thereafter can be resolved a little earlier. For example, there is estimated the booster negative pressure PBE when the brake is relaxed to a brake depressing amount BS0 in depressing the brake. When the estimated booster negative pressure PBE becomes lower than the predetermined negative pressure PBth, the engine is restarted. Thereby, there can be prevented a reduction in the negative pressure when the brake is temporarily relaxed and is rapidly depressed.

The booster negative pressure reducing amount ΔP in relaxing a current brake depressing amount BS(i) to the predetermined brake depressing amount BS0, is approximated by a quadratic function constituting a variable by a brake depressing amount change amount ΔBS (BS(i)−BS0). Therefore, the estimated booster negative pressure PBE may be calculated by calculating the booster negative pressure reducing amount ΔP by substituting a maximum brake depressing amount change amount ΔBS having a possibility of being brought about immediately thereafter, for a previously stored quadratic function and subtracting ΔP from the booster negative pressure PB detected at current time.

Figure 12:
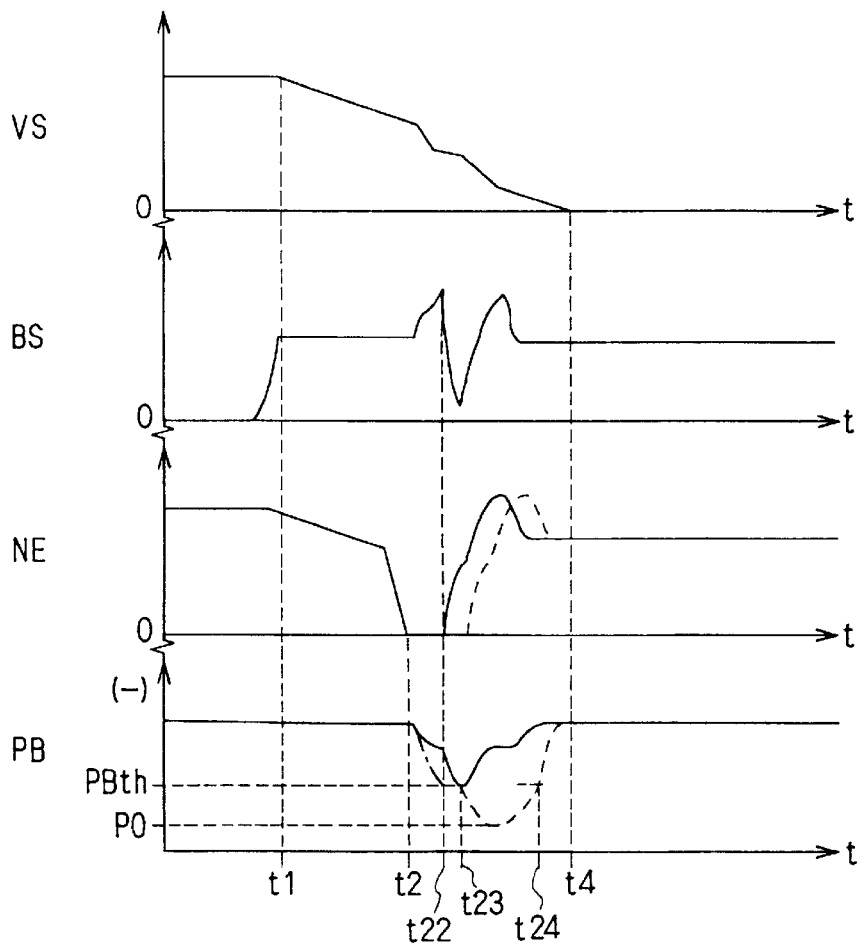
FIG. 12 is a time chart showing operating conditions under a control of the second embodiment of the present invention.

FIG. 12 shows operating conditions between a case of using the above-described estimated booster negative pressure PBE (solid lines) and a case of not using the estimated booster negative pressure PBE (broken lines). Incidentally, there is carried out pumping operation in both of the cases. In FIG. 12, the estimated booster negative pressure PBE reaches to the threshold PBth at time t22, then the ECU 17 restarts the engine. As a result, the engine speed NE quickly recovered to prevent excessive drop of the booster negative pressure. In case of not using the estimated booster negative pressure, the booster negative pressure PB may drops below the threshold PBth from t23 to t24.

Third Embodiment

An explanation will be given as follows of an automatic engine stop and start system according to a third embodiment. In this embodiment, the system does not have the booster negative pressure sensor. Alternatively, in this embodiment, numeral 40 in FIG. 1 designates a hydraulic pressure sensor for detecting a hydraulic pressure PF of brake fluid in a brake master cylinder and an intake pressure sensor for detecting an intake pressure PM of the engine.

Figure 13:
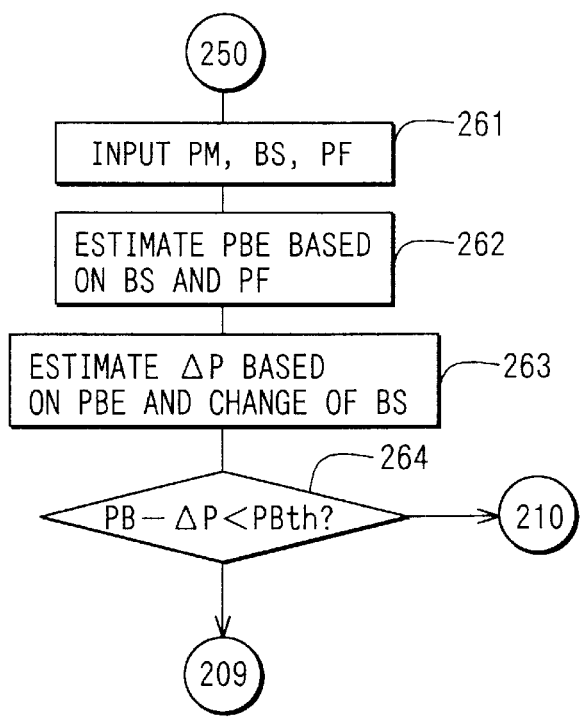
FIG. 13 is a flowchart according to a third embodiment of the present invention.
Figure 14:
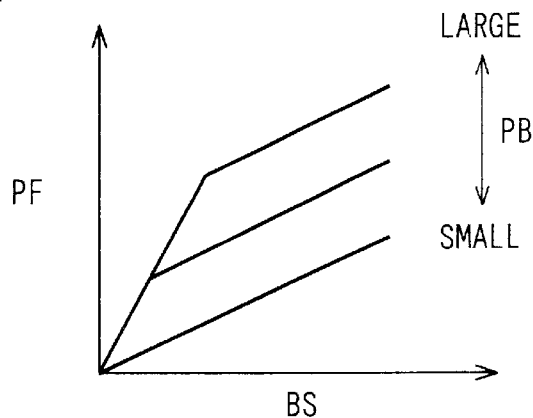
FIG. 14 is a graph showing characteristics of master cylinder pressure versus brake depressing amount with respect to booster negative pressures according to the third embodiment of the present invention.

FIG. 13 is an alternative process for the step 250 in FIG. 1. In FIG. 13, first, the intake pressure PM, the hydraulic pressure PF and the brake depressing amount BS are detected at step 261. The booster negative pressure PBE before stopping the engine is estimated at step 262. The booster negative pressure PBE is estimated by looking up a predetermined map based on the intake pressure PM, the hydraulic pressure PF and the brake depressing amount BS. FIG. 14 is a map that shows a relationship among the booster negative pressure PB, the hydraulic pressure PF and the brake depressing amount BS.

Next, an amount of consuming the booster negative pressure PB by accumulating a variation in the brake depressing amount at and after calculating the booster negative pressure PBE before stopping the engine, is calculated based on the previously stored map showing the relationship between the booster negative pressure PB and a change in the brake depressing amount BS as step 263. It is determined whether a value produced by accumulating an amount which has been consumed and subtracting the amount from the booster negative pressure PBE before stopping the engine is smaller than the predetermined threshold PBth at step 264. When the value is smaller, the operation proceeds to step 210 and the engine is restarted, otherwise, the operation proceeds to step 209.

Thereby, even when the booster negative pressure sensor is not provided, the above-described strange feeling in the braking operation caused by a delay in restarting the engine can be reduced.

Fourth Embodiment

Figure 17:
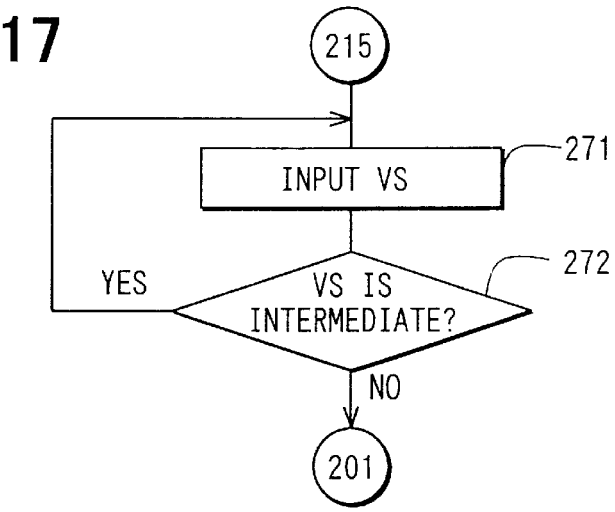
FIG. 17 is a flowchart according to a fourth embodiment of the present invention.

An explanation will be given of an automatic engine stop and start system according to a fourth embodiment. In this embodiment, a process for prohibiting an engine stopping is added to the first embodiment. Referring to FIG. 17, steps 271 and 272 are added behind the step 215.

Figure 18:
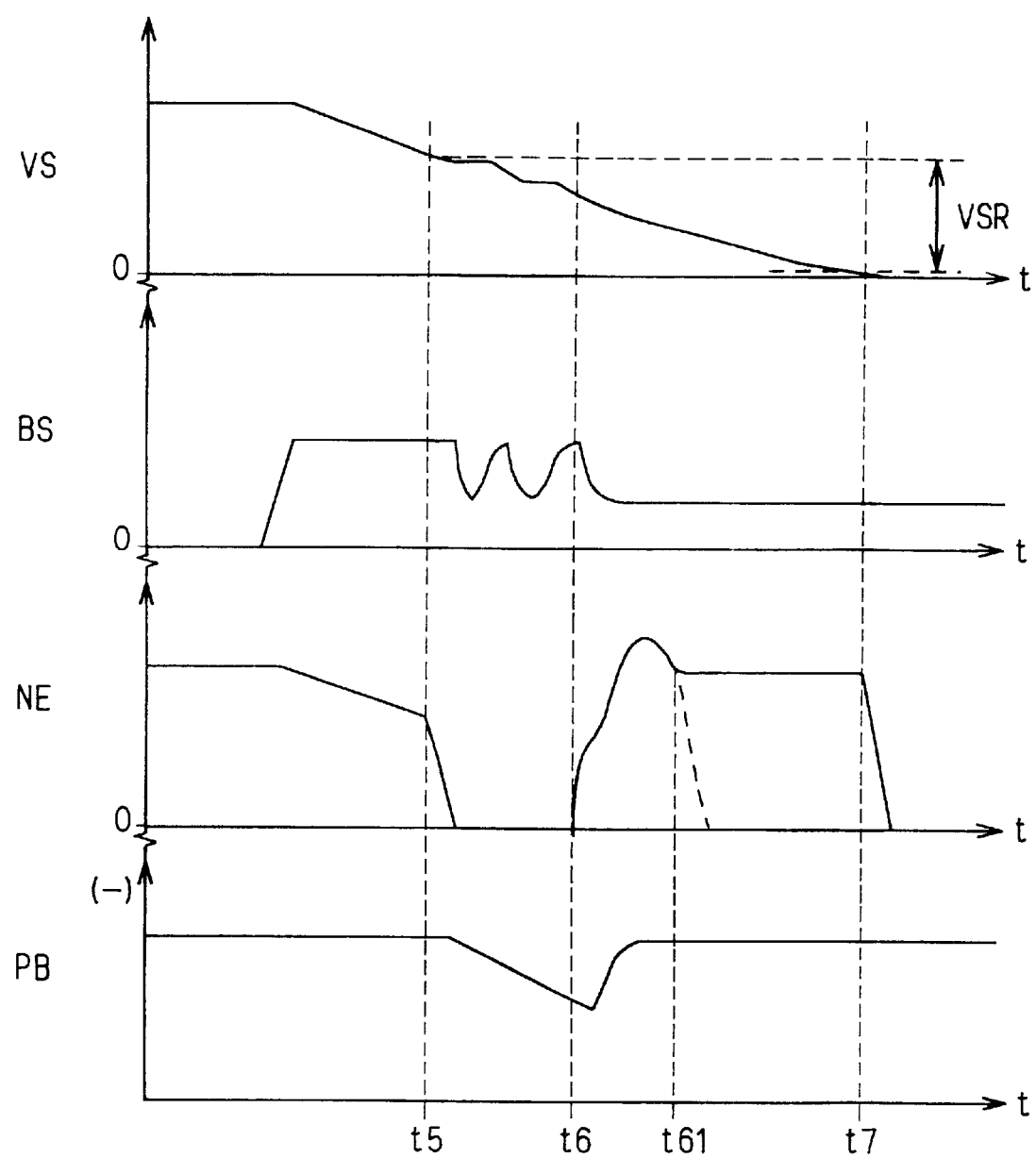
FIG. 18 is a time chart showing operating conditions under a control of the fourth embodiment of the present invention.

At step 271, the vehicle speed VS is detected after the engine has been restarted. When the vehicle speed VS falls in a predetermined intermediate speed range, the operation returns to step 271. As a result, the process circulates the steps 271 and 272 for certain period, the engine is prohibited from being stopped. Otherwise, the process returns to the step 201. FIG. 18 shows operating conditions under a control of the fourth embodiment. The engine is operated to stop rotation at time t5. Then, the engine is restarted at time t6. According to the conventional control the engine may be stopped at time t61 due to the operating condition. However, according to the fourth embodiment, the engine is kept running during the vehicle speed VS is in a predetermined intermediate range VSR. Therefore, the engine is stopped at time t7 that is significantly later than the conventional time t61.

According to the embodiment, even when the engine stopping condition is established by finishing the downward road in which the booster negative pressure is ensured after restarting the engine, when the vehicle speed falls in the predetermined intermediate range VSR, the engine is prohibited from being stopped. Thereby, although when the vehicle is stopped or when the vehicle is decelerated again after reaccelerating, the engine is permitted to stop, in the other case, the engine is prohibited from being stopped and running feeling can be promoted by preventing busy feeling caused by frequent stopping and restarting the engine.

Fifth Embodiment

Although according to the above-described embodiments, promotion of fuel cost is achieved by automatically stopping and restarting the engine while resolving the deficiency in the booster negative pressure PB as swiftly as possible, there is conceivable a case in which restarting of the engine is not realized by a failure in the starter or the like, or a case in which restarting of the engine is abnormally delayed.

In this case, the booster negative pressure is further reduced by the braking operation in stopping the engine. Hence, according to the embodiment, after instructing to restart the engine, it is confirmed whether the engine has finished restarting, when failed, the vehicle is automatically stopped by directly controlling the brake hydraulic pressure.

Figure 19:
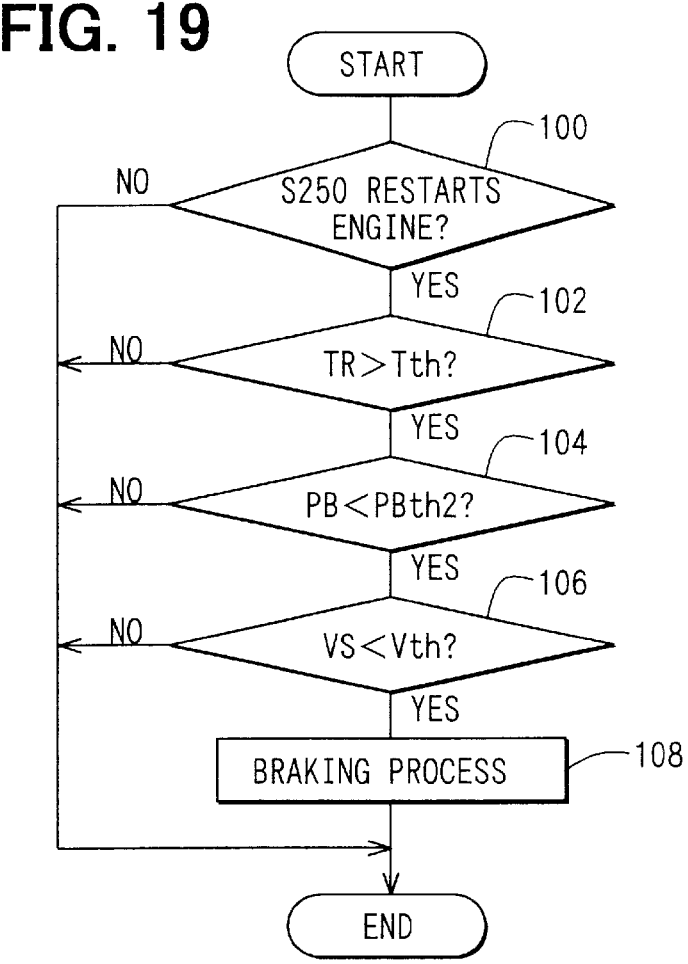
FIG. 19 is a flowchart according to a fifth embodiment of the present invention.

A detailed explanation will be given in reference to a flowchart shown in FIG. 19. The flowchart shown in FIG. 19 is executed periodically as an interrupt routine to the routine shown in FIG. 2.

First, at step 100, it is investigated whether the engine is instructed to restart due to a determination in the step 250. When the engine has been instructed to restart, it is investigated whether an elapse time period TR after the engine has been instructed to restart, exceeds a predetermined threshold Tth at step 102. The elapse time period TR is set to a time period sufficient for the booster negative pressure PB to be necessarily larger than a second booster negative pressure threshold PBth2 when the engine has normally been restarted.

Next, it is investigated whether the booster negative pressure PB is smaller than the second booster negative pressure threshold PBth2 at step 104. When the booster negative pressure PB is smaller than the second booster negative pressure threshold PBth2, it is determined that restarting the engine is failed and it is investigated whether the vehicle speed VS is equal to or larger than a predetermined value Vth at step 106. When the vehicle speed VS is equal to or larger than the predetermined value Vth, the ECU 17 determines a direct braking hydraulic pressure in accordance with the brake depressing amount BS at step 108. At step 108, the determined direct braking hydraulic pressure is instructed to, for example, a hydraulic pressure control apparatus for traction control. The hydraulic pressure control apparatus is included in the brake system 34. As a result, the hydraulic pressure control apparatus for traction control generates necessary braking hydraulic pressure in the master cylinder or the wheel cylinder of the brake.

Figure 21:
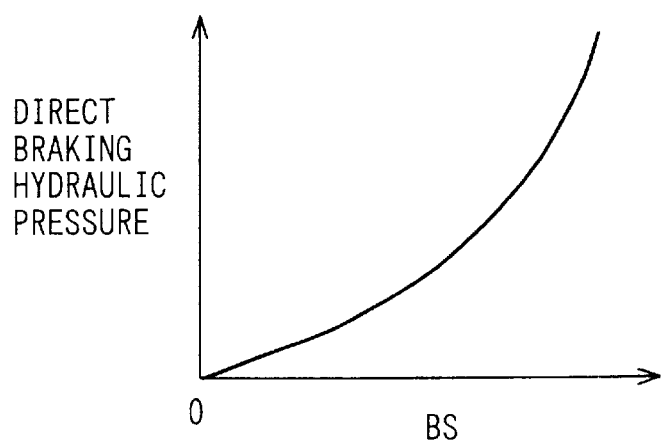
FIG. 21 is a graph showing a relationship between a hydraulic pressure and a brake depressing amount.
Figure 20:
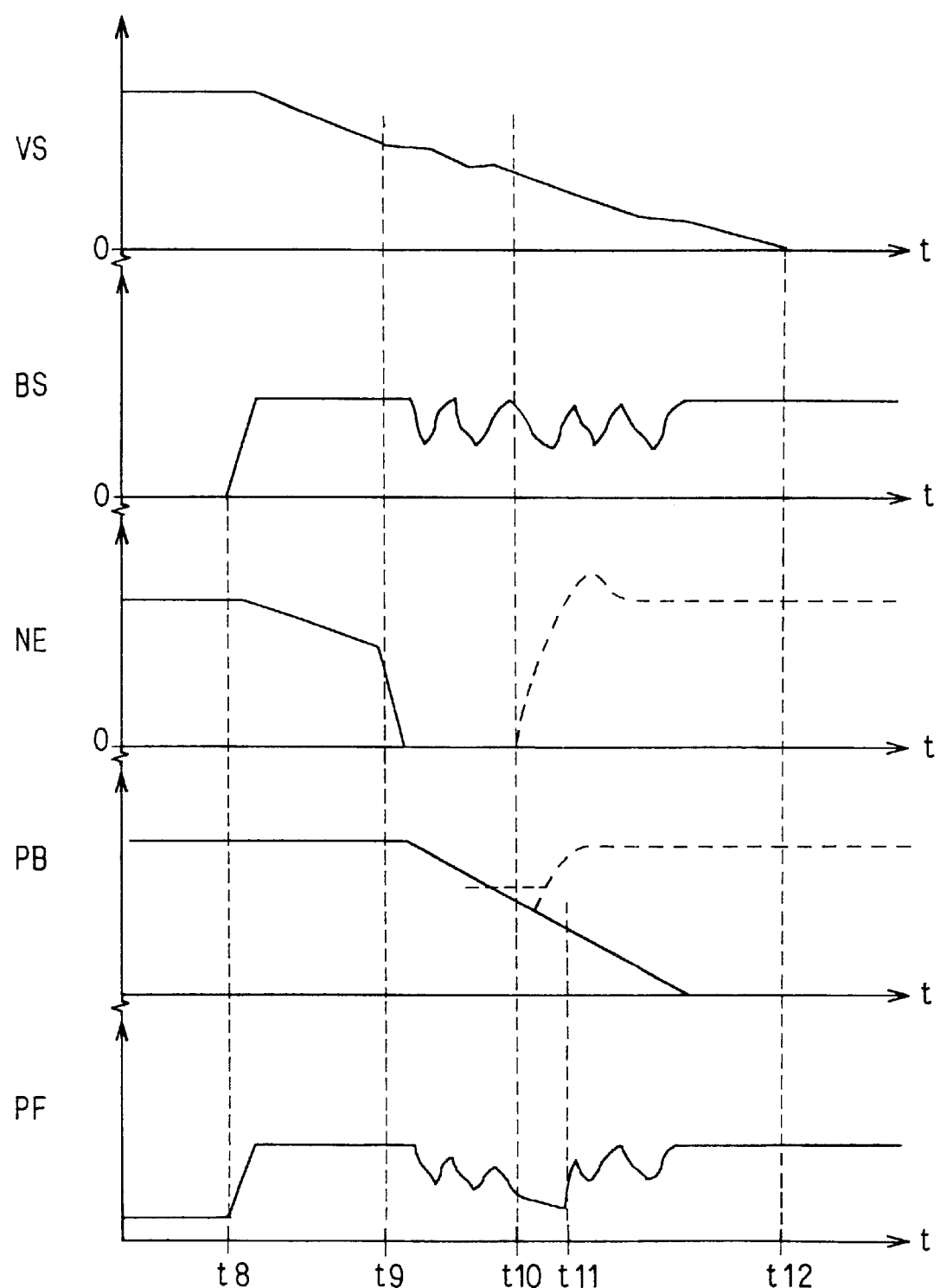
FIG. 20 is a time chart showing operating conditions under a control of the fifth embodiment.

FIG. 20 shows operating conditions under a control of the fifth embodiment. The driver operates the brake from time t8. The engine is instructed to stop rotation at time t9. According to the above-described embodiments, the ECU 17 instructs restarting the engine at time t10. However, the engine can not be restarted, therefore, the booster negative pressure PB is continuously decreased. According to the fifth embodiment, the ECU 17 instructs to increase brake fluid pressure directly by the hydraulic control device such as the traction control apparatus from time t11. Therefore, even if the booster negative pressure PB is not recovered, the vehicle can be stopped under an assist of the direct braking hydraulic pressure supplied from time t11 to t12. The direct braking hydraulic pressure may be calculated by putting the brake depressing amount BS to a previously stored map such as a map shown in FIG. 21. The map shows a relationship between the direct braking hydraulic pressure and the brake depressing amount. Further, as the hydraulic pressure control apparatus for directly controlling the brake pressure, mentioned above, other than the hydraulic pressure control apparatus for traction control, a hydraulic pressure control apparatus for ABS or brake assist may be used. The direct braking hydraulic pressure control per se in ABS or traction control has already been well known and therefore, illustration of the hydraulic pressure circuit diagram will be omitted.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An automatic engine stop and start system comprising:

negative pressure detecting means for detecting negative pressure of a brake booster for assisting a braking operation, the negative pressure being supplied by an engine or an apparatus driven by the engine;

braking operation detecting means for detecting a braking operation of a driver; and a controller for instructing automatic stopping or automatic starting of the engine under establishment of a predetermined condition of the engine based on an input signal, wherein the controller instructs the automatic starting of the engine when it is determined that there is carried out a predetermined braking operation for bringing about, as a result, a situation in which the booster negative pressure is estimated to be smaller than a predetermined threshold based on the booster negative pressure and the braking operation.

2. The system according to claim 1, wherein controller instructs the automatic starting when there is carried out an operation in which a brake depressing amount is equal to or larger than a predetermined value as the predetermined braking operation under a situation in which the booster negative pressure is equal to or smaller than a predetermined value.

3. The system according to claim 1, wherein the controller instructs the automatic starting when there is carried out an operation in which a rate of changing a brake depressing amount is equal to or larger than a predetermined value as the predetermined braking operation under a situation in which the booster negative pressure is equal to or smaller than a predetermined value.

4. The system according to claim 1, wherein the controller instructs the automatic starting when there is carried out an operation in which an accumulated change amount of a brake depressing amount during an immediately proximate predetermined time period is equal to or larger than a predetermined value as the predetermined braking operation under a situation in which the booster negative pressure is equal to or larger than a predetermined value.

5. The system according to claim 1, wherein the controller estimates the booster negative pressure when the brake depressing amount is made to be smaller than a current value thereof by a predetermined amount from the current booster negative pressure and the current brake depressing amount and instructs the automatic starting when the estimated booster negative pressure is smaller than the predetermined threshold.

6. The system according to claim 1, further comprising:

vehicle speed detecting means for detecting a vehicle speed, wherein the controller adjusts the predetermined threshold in accordance with the vehicle speed.

7. The system according to claim 1, further comprising:

vehicle speed detecting means for detecting a vehicle speed, wherein the controller predominantly prohibits the automatic stopping of the engine when the vehicle speed falls in a predetermined range after restarting the engine in running the vehicle.

8. The system according to claim 1, further comprising:

hydraulic pressure controlling means capable of controlling a brake hydraulic pressure, wherein the controller generates a braking force by directly controlling the brake hydraulic pressure by instructing the brake hydraulic pressure controlling means when information with regard to a failure in starting the engine is inputted after instructing to start the engine.

9. An automatic engine stop and start system comprising:

negative pressure detecting means for detecting a negative pressure of a negative pressure source generated by an engine or an apparatus driven by the engine and supplied to a brake booster for assisting a braking operation;

master cylinder pressure detecting means for detecting a pressure of a brake master cylinder;

braking operation detecting means for detecting the braking operation of a driver; and a controller for instructing automatic stopping or automatic starting of the engine under establishment of a predetermined condition of the engine based on an input signal, the controller instructs the automatic starting when it is determined that there is carried out a predetermined braking operation for bringing about, as a result, a situation in which the booster negative pressure is estimated to be smaller than a predetermined threshold based on the negative pressure of the negative source, the pressure of the brake master cylinder and the braking operation.

10. The system according to claim 9, wherein the braking operation detecting means comprises a brake depressing amount sensor.

11. An automatic engine stop and start system comprising:

a brake system having a brake booster for assisting a braking operation of a driver by using a negative pressure generated by an engine or an apparatus driven by the engine;

a controller for instructing automatic stopping or automatic starting of the engine under establishment of a predetermined condition of the engine based on an input signal; and downward road detecting means for detecting that a vehicle runs on a downward road, wherein the controller prohibits the engine from being stopped in running on the downward road.

12. The system according to claim 11, wherein the downward road detecting means determines the downward road when a detected inclination of the vehicle is larger than a predetermined inclination threshold.

13. The system according to claim 11, wherein the downward road detecting means detects the downward road based on a detected running acceleration and a detected brake depressing amount.

* * * * *